Sept. 9, 1941.   L. L. LUSE   2,255,624
TRAILER HITCH
Filed Sept. 30, 1940   2 Sheets-Sheet 1
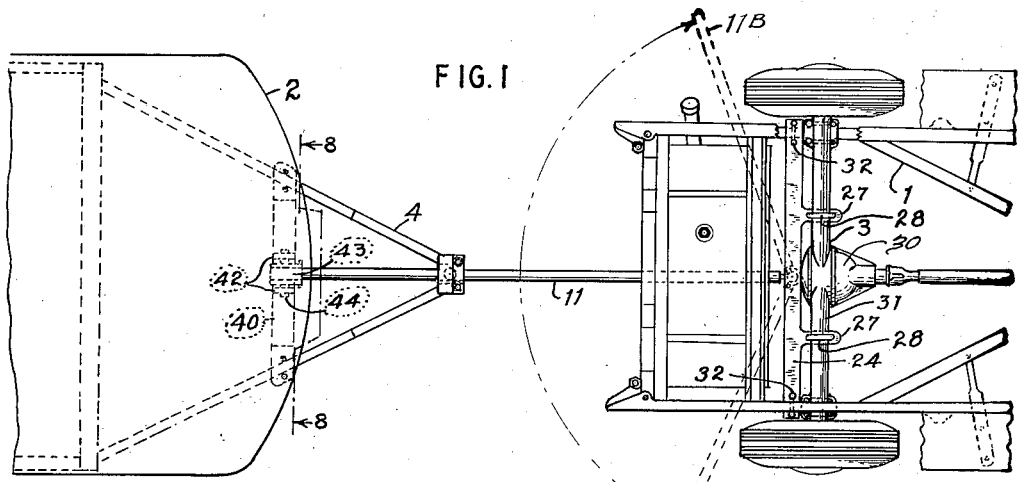
FIG.1
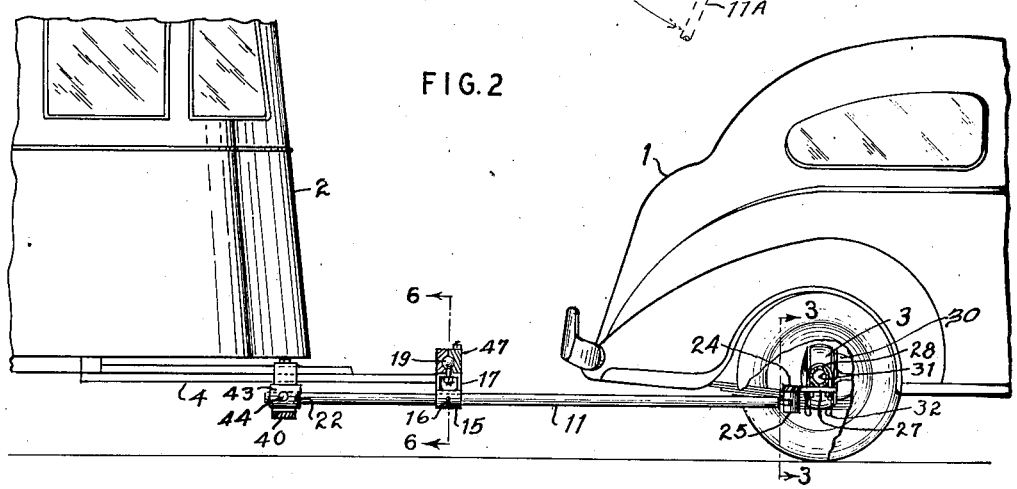
FIG.2
FIG.3
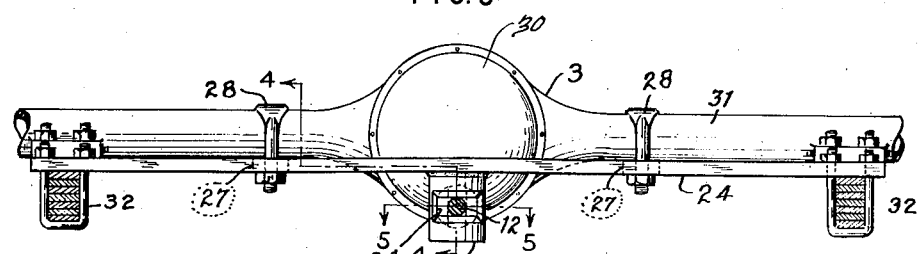
FIG.4
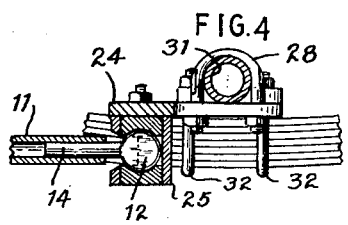
FIG.5
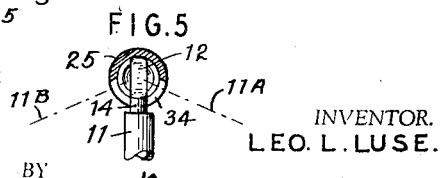
INVENTOR.
LEO. L. LUSE.
BY
Robert W. Wilson
ATTORNEY Sept. 9, 1941.    L. L. LUSE    2,255,624
TRAILER HITCH
Filed Sept. 30, 1940    2 Sheets-Sheet 2
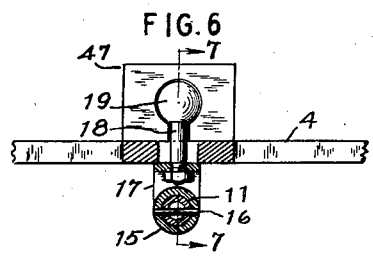
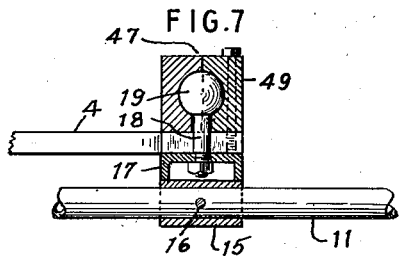
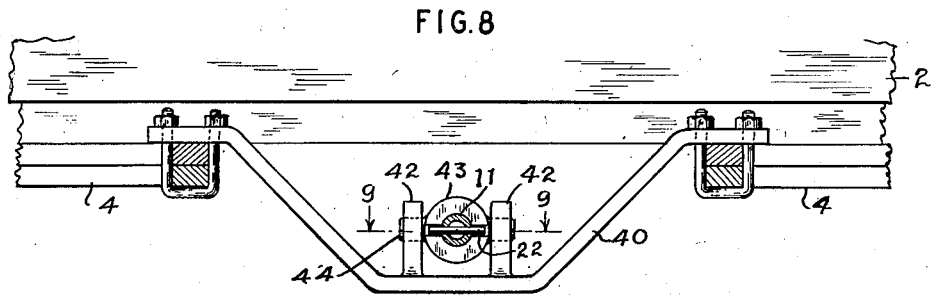
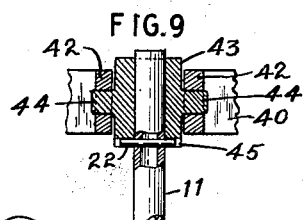
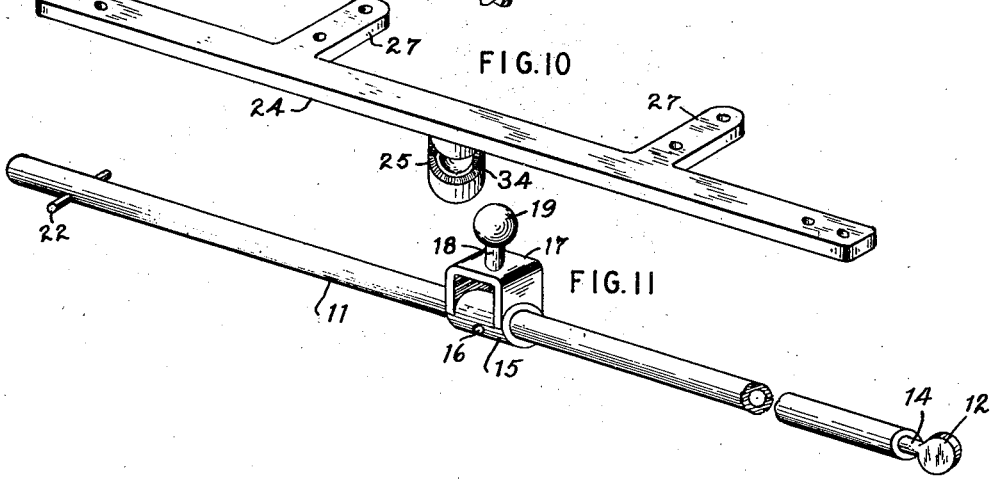
INVENTOR.
LEO L. LUSE.
BY *Robert W. Wilson*
ATTORNEY.

Patented Sept. 9, 1941

2,255,624

UNITED STATES PATENT OFFICE 2,255,624

TRAILER HITCH

Leo L. Luse, Painesville, Ohio

Application September 30, 1940, Serial No. 359,111

3 Claims. (Cl. 280—33.44)

This invention relates to a hitch for attaching a trailer to an automobile, its purposes including the provision of such a hitch of simpler and sturdier construction than hitherto known, and which can be fastened to the towing car in a more efficient manner than has hitherto been the case and in such a way that the pulling of the trailer will not interfere with the riding qualities of the towing car. A further purpose is to provide a hitch which in itself gives all the spring action necessary between the towing car and the trailer, and which is easy of application and of release, but is positively fastened when in use so that it can not work apart or come undone except by the intentional operative manipulation of the user.

One of the important advantages of my invention is that the pulling is entirely done from the running gear of the towing car and not from the body. Thus when the trailer is pulled there is no tendency to hold down the rear end of the towing car and raise its front, nor is there any load on the towing car's springs at any time due to such weight as is carried by the front end of the trailer. Sidesway of the towing car is not increased when pulling the trailer around a corner, since the pull of the trailer has no effect whatever on the car body. In present practice of towing trailers, it is generally considered necessary to put what are known as helper springs under the rear end of the car body to reinforce the regular springs, and thus to accommodate and compensate for the additional downward pull of the trailer on the car body. Helper springs are rendered entirely unnecessary by my invention, and the only provision that needs to be made for towing the trailer is to inflate the rear tires of the towing car to greater pressure than the front tires. This additional pressure of course can easily be valved out when there is no trailer attached, whereas helper springs are permanently attached but have the disadvantageous effect of needlessly raising the rear end of the body when no trailer is attached, and also of making the rear end ride hard.

Other aims and advantages of the invention will appear from the following description and from the accompanying illustrative drawings. In the drawings:

Fig. 1 is a plan view showing the rear portion of the running gear of a passenger car and the front end of a trailer being pulled thereby, attached by my improved hitch;

Fig. 2 is a side elevation corresponding to Fig. 1, with certain portions in vertical section;

Fig. 3 is a transverse vertical elevation on the plane 3—3 of Fig. 2, but on a larger scale, and with certain parts sectionalized;

Fig. 4 is a composite vertical section on a plane transverse to that of Fig. 3 and shown by the line 4—4 of Fig. 3;

Fig. 5 is a horizontal section on the plane 5—5 of Fig. 3, with parts in elevation;

Fig. 6 is an enlarged transverse vertical section on the plane 6—6 of Fig. 2, with parts in elevation;

Fig. 7 is a view corresponding to Fig. 6 but at right angles thereto, on plane 7—7 of Fig. 6;

Fig. 8 is a transverse vertical elevation with parts in section, showing the attachment of the hitch to the trailer, the view being taken on plane 8—8 of Fig. 1;

Fig. 9 is an enlarged horizontal section on plane 9—9 of Fig. 8, with parts in elevation;

Fig. 10 is a perspective of the attachment bar which is fastened to the towing car, one suitable form being shown; and Fig. 11 is a perspective view of the hitch bar by itself.

In Figs. 1 and 2 a passenger automobile 1 is illustrated as towing a house type trailer 2, but it will be appreciated that these are merely types, and that my hitch may be adapted to other and heavier loads pulled by trucks or tractors. The rear axle, transmission and associated parts of the towing car are generally represented at 3 and a conventional hitch attachment including a triangular frame on the trailer is generally represented at 4. It will be appreciated that these general representations are merely illustrative and are susceptible of modification according to specific types of automobiles and specific types of trailers, and that certain details of my attachment may be modified accordingly as required by the particular constructions with which used.

The hitch comprises a hitch bar 11 so proportioned in stiffness, diameter and length as to be effectively flexible under the transverse stresses expected in the service for which it is designed. By way of example I will mention that the hitch bar may conveniently be made of a steel tube from 6½ to 7 feet long overall, 2¼ inches outside diameter, with ¼ inch wall thickness, as a typical suitable size and weight for coupling ordinary trailers to passenger cars. It will be understood that these dimensions are subject to variation according to the circumstances in which the hitch is used, such circumstances including the weight of the trailer, the power of the towing car, and so on.

The front of the hitch bar 11 carries a coupling head which may conveniently be in the form of a disc 12 secured thereto or formed thereon. For example, the head is shown as a unitary forging including the disc 12 and a rod or shank 14 which fits in the front end of the tube and is welded or otherwise firmly secured therein. Well back of the midlength of the hitch bar, say about 2 feet from the rear end if the bar is on the order of 6 or 7 feet long, a sleeve 15 is secured, preferably by a through pin 16 rather than by welding, since it is desirable to maintain the resiliency of the bar throughout its length whereas the heat of welding would be apt to impair its spring properties. A saddle 17 is welded or otherwise secured to one side of the sleeve, and a stem 18 carrying a ball 19 on its upper end is fast to and extends from the top portion of this saddle, all being firmly secured together, so that the hitch bar with all attachments will be moved as a unit, particularly when turned about the axis of the bar 11. A pin 22 is firmly set through the bar 11 at a point fairly close to the rear end of the bar.

The preferred means of attaching the hitch bar to the towing car comprises a cross-bar 24 with a coupling socket 25 secured thereto and carried thereby, preferably beneath, so as to permit the hitch bar 11 to extend below the gasoline tank and the rear bumper, but with no parts below the bottom of the differential case 30. In the form shown in Fig. 10, which of course may be modified as required by the specific construction of various types of cars, the cross-bar has two forwardly projecting arms 27 spaced far enough out from the center to clear the differential 30, as will best be seen in Fig. 1. It is attached to the rear axle 31 by U-bolts 28, at its ends to the car springs by other U-bolts 32. The coupling socket 25 is horizontally slotted as at 34 to receive the coupling head 12 when the head 12 is turned with its flat faces horizontal. The socket 25 is also internally hollowed at top and bottom, so as to engage the head 12 and lock it in the socket when the hitch bar is turned about the bar axis from the entrance position, so as to bring the flat faces of head 12 vertical.

The triangular frame generally indicated as 4 in Figs. 1 and 2 illustrates a standard hitch connection for trailers. I fasten a drop-center yoke 40 across the frame 4, preferably under the front end of the trailer, all as shown in Figs. 1, 2 and 8. Two upstanding ears 42 are secured to the dropped center of the yoke, and a sleeve or socket 43 is mounted on these ears by trunnions 44, with its opening extending lengthwise of the trailer 2. The bore of the sleeve is such as to receive the rear end of the hitch bar 11 with a sliding fit. The front end of the tube may be notched as at 45 to receive the positioning pin 22 as shown in Figs. 8 and 9.

A conventional trailer coupling 47 is attached at the apex of the attachment rods 4. This coupling, which consists of a pair of separable blocks 48 and 49, mutually socketed so as to receive and hold the stem 18 and ball 19, is not in itself a part of my invention; and if some other coupling is substituted, the stem 18 and ball 19 will be replaced by other connections adapted to the coupling used on the trailer, but such substitutes will be carried upon the member 17.

In operation the hitch bar does its pulling between the coupling head 12 and the ball connection 19, so that the rear portion of the bar in the sleeve 43 is for the purpose of keeping the hitch bar 11 pointing along the axis of the trailer, also to give a steadying effect and to cause or assist in a certain spring action which will presently be described.

The horizontal amplitude of the slot 34 is sufficient to allow as wide swinging motion of the hitch bar 11 as can be obtained while retaining the necessary clearance of the rear wheels of the car. Thus, as shown in Fig. 1, the car and trailer can turn to a relative mutual angle of about 135°, between the dotted positions 11A and 11B, as also shown in Fig. 5.

To couple up, the rear end of the hitch bar 11 is inserted in the sleeve 43, with the disc 12 horizontal, the disc 12 is inserted through the slot 34 into the socket 25. Thereafter the hitch bar 11 is turned 90° on its own axis, using the saddle 17 or ball 19 as a convenient handle, so as to bring the disc 12 upright into locking position, which also brings the ball 19 in position to be fastened into the connection 47 on the trailer. The attachment or connection 47 is then closed by putting its forward block 49 in place against the rear block 48 (in the specific form of connector shown) and bolting it there or otherwise securing it as may be provided for.

As mentioned, the traction is by the portion of the bar 11 from the head 12 to the sleeve 15, but the rear extension of the bar has important effects. For one thing it keeps the hitch bar from turning sideways relatively to the trailer. For another thing, in going over irregularities in the road the bar 11, being resilient, itself acts as a spring, or as a resilient lever of the second or third order, with fulcrum in the sleeve 43. For example if there is a downward or upward tendency on the connection 47, it will result in some bending of the hitch rod 11, but since the rod is in effect a spring, it will straighten when the bending stress is removed. Thus the hitch bar is its own spring, and the various spring attachments in addition to the towing bar which are used in trailer hitches are not needed. The same action applies for sideward movement, although primarily the spring action is necessary in a trailer hitch to allow the freedom needed for going over bumps in the road. However, when a stop is made the trailer front "noses down," and the spring action works as a cushion between trailer and car.

It will be appreciated that while I have herein shown and described a particular form and application of a trailer hitch, the disclosure is not to be taken as limiting the invention, but as illustrative, and that the invention may be applied in other detailed manners and mechanisms, including heavy commercial hauling, pulling farm implements by tractors, and other uses, all such modifications being within the scope of the claims appended hereto.

I claim:

1. A trailer coupling comprising in combination an attachment for a car axle, said attachment including a coupling element; a single resilient pole adapted to connect with said coupling element at one end, an attachment for the trailer comprising a movably mounted element engageable with the rear end of said pole but allowing relative axial motion therewith, and an intermediate attachment upon the pole connected with the pulling coupling on the trailer.

2. A trailer coupling comprising in combination a cross bar adapted for attachment to a car axle, a coupling element attached to said bar with no part below the bottom of the differential casing, a single resilient hitch bar, a connection on one end of said hitch bar adapted to engage said coupling element, an attachment for the trailer comprising a movably mounted element engageable with the rear end of said hitch bar but allowing relative axial motion therewith, an intermediate coupling attachment upon said hitch bar, and a coupling element on the trailer in advance of said movably mounted element, and adapted to engage with said intermediate coupling attachment.

3. A trailer hitch comprising a tube, a flat cylindrical coupling head on the forward end of said tube, a coupling receptacle complementary to said head secured to a towing vehicle, said receptacle comprising a hollow body with an external wall slot of dimensions to admit said head when turned in one direction and to hold it when turned in another direction, a sleeve secured intermediate the length of said tube, a coupling member secured to said sleeve and offset from said tube, a coupling element on a trailer adapted to engage said last-named coupling member, a transverse pin secured near the rear end of said tube, a receptacle on the trailer rearward of said sleeve and adapted to receive the rear end of said tube and a notch on the front end of said receptacle adapted to engage said transverse pin when said tube is in its coupled position.

LEO L. LUSE.